United States Patent [19]

Parsi et al.

[11] Patent Number: 5,203,976
[45] Date of Patent: * Apr. 20, 1993

[54] INTRODUCING AND REMOVING ION-EXCHANGE AND OTHER PARTICULATES FROM AN ASSEMBLED ELECTRODEIONIZATION STACK

[75] Inventors: Edgardo J. Parsi, Lexington; Keith J. Sims, Framingham; Irving D. Elyanow, Somerville; Thomas A. Prato, Cambridge, all of Mass.

[73] Assignee: Ionics, Incorporated, Watertown, Mass.

[*] Notice: The portion of the term of this patent subsequent to Jun. 9, 2009 has been disclaimed.

[21] Appl. No.: 866,782

[22] Filed: Apr. 6, 1992

Related U.S. Application Data

[62] Division of Ser. No. 743,068, Aug. 9, 1991, Pat. No. 5,120,416, which is a division of Ser. No. 495,513, Mar. 19, 1990, Pat. No. 5,066,375.

[51] Int. Cl.$^5$ .............................. C02F 1/46; C25B 1/00
[52] U.S. Cl. ........................... 204/182.4; 204/182.3; 204/182.5; 204/151; 204/301
[58] Field of Search ................. 204/182.4, 182.5, 301, 204/151, 182.3

[56] References Cited

U.S. PATENT DOCUMENTS

| | | | |
|---|---|---|---|
| 4,871,431 | 10/1989 | Parsi | 204/182.4 |
| 5,026,465 | 6/1991 | Katz et al. | 204/182.4 |
| 5,066,375 | 11/1991 | Parsi et al. | 204/182.4 |
| 5,120,416 | 6/1992 | Parsi et al. | 204/182.4 |

Primary Examiner—John Niebling
Assistant Examiner—Arun S. Phasge
Attorney, Agent, or Firm—Norman E. Saliba

[57] ABSTRACT

Apparatus and method for introducing ion-exchange and other particulates into certain compartments of an assembled electrodeionization stack comprising flowing a slurry of said particulates into the compartments while employing strainers for particulate retention so as to form a packed bed in the compartments; also apparatus and method for flowing said particulates out of said stack in the form of a slurry.

9 Claims, 4 Drawing Sheets

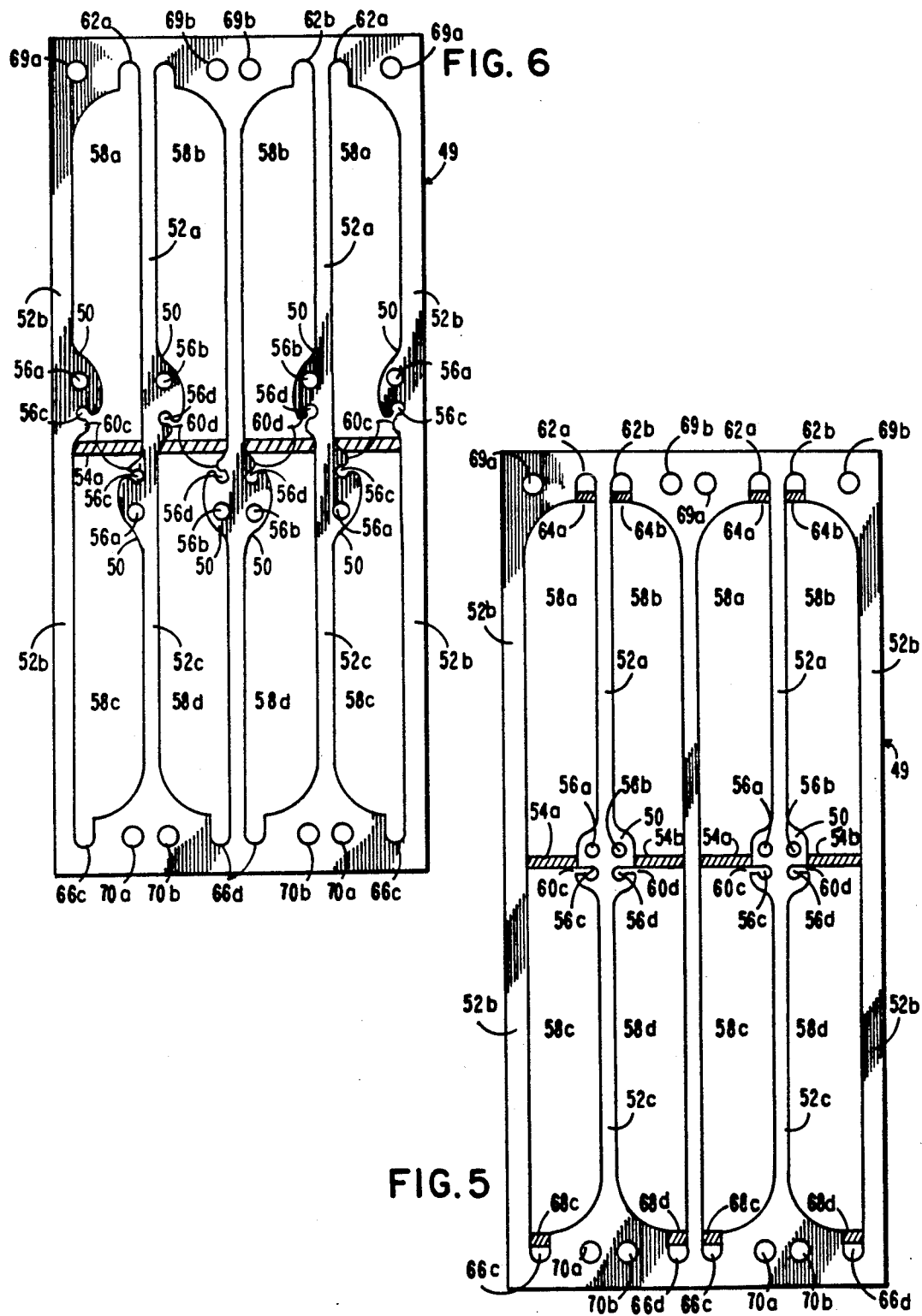

INTRODUCING AND REMOVING ION-EXCHANGE AND OTHER PARTICULATES FROM AN ASSEMBLED ELECTRODEIONIZATION STACK

This is a division of Ser. No. 743,068 filed Aug. 9, 1991 (U.S. Pat. No. 5,120,146) which in turn is a division of Ser. No. 495,513 filed Mar. 19, 1990 (U.S. Pat. No. 5,066,375).

BACKGROUND OF THE INVENTION

1. Field of the Invention

The invention resides in the field comprising the electrical transfer of electrolytes (including weakly dissociated electrolytes) from a first fluid to a second fluid and more particularly relates to apparatus and processes utilizing the principle of electrodeionization- (EDI), i.e. to electrodialysis apparatus and processes in which at least one compartment of said apparatus is packed with particulate ion exchange material.

2. Description of the Prior Art

Electrodeionization (EDI) is a process for transferring electrolytes (including weakly dissociated electrolytes) from a first fluid to a second fluid under the influence of a substantially direct electric potential applied to an electrodialysis apparatus in which at least some of the flow compartments, generally at least some of the diluting compartments, are substantially filled or packed with particulate ion exchange material.

EDI is particularly attractive to deionize waters with low total dissolved solids content, which exhibit low electrical conductivity and which thus limit the current capacity of conventional electrodialysis. The highly conductive ion exchange resin packing in EDI provides a conductive path between ion exchange membranes and also increases the surface area available for removal of ionized dissolved solids from the water.

Although it is not intended that this invention be limited in any way by any theory of electrodeionization (i.e., electrodialysis with compartments packed with particulate ion exchange material) nevertheless the following may help to understand the technology, this invention, and the various functions of the particulate ion exchange material packing.

Referring to Figure, it represents schematically and in a simplified way one possible arrangement of such packing. In 1(a) "C" represents a cation selective membrane, i.e. an electrolytically conductive sheet or film in which the electric current is carried substantially exclusively by cations; "A" represents an anion selective membrane, i.e. an electrolytically conductive sheet or film in which the electric current is carried substantially exclusively by anions; "CX" represents particulate cation exchange material and "AX" represents particulate anion exchange material. The mix of particulates may range from all-cation-exchange to all anion-exchange, but for electrodeionization approximately an equinormal mixture of CX and AX is generally preferred. For purposes of illustration in FIG. 1(a) the space between membranes C and A is packed with an approximately equinormal mixture of particulate CX and AX, in one possible random arrangement. There are many different such arrangements of the 8 CX particles and 12 AX particles corresponding to this approximately equinormal example based on typical commercial ion exchange resin capacities, but that shown will serve to illustrate most of the processes occurring in such packed deionization cells.

The chamber represented by the region between membrane C and membrane A is a demineralizing, depleting, or diluting compartment, i.e. if the compartment contains in addition to the ion exchange particulates CX and AX a solution of a dissociated electrolyte in the interstices among the particles CX and AX, then cations from such solution will tend to migrate through membrane C toward electrode $E^-$ and anions through membrane A toward electrode $E^+$ thereby depleting the electrolyte in the chamber. It is well known (See Heymann and O'Donnell, *J. Colloid Sci.*, 4, 395(1949)) that strongly dissociated ion exchange materials (including ion selective membranes) have specific electrical resistances of order of magnitude about 100 ohm-cm, i.e. about the same as an aqueous solution containing about 0.1 gram- equivalent of sodium chloride per liter. Hence if the solution in the interstices is an aqueous solution of sodium chloride containing much less than about 0.1 gram equivalent per liter (say about 0.01 gram- equivalent per liter) then the electrical resistance of the ion-exchange particulates will be much less than that of the solution. Then the low resistance path for anions will be through anion exchange particulates AX and for cations through cation exchange particulates CX. The first column from the left is such a low resistance cation path. The cation exchange particle in the second column also feeds that path. In the two dimensional pattern of FIG. 1(a) the cation exchange particle in the fourth column is a dead end (but in three dimensions, i.e. in the planes immediately above and below that shown in FIG. 1(a), there could be connections to CX particle paths leading to membrane C. There are no dead-end anion particles in the figure. Some anions pass around cation exchange particles which are in the way. At many contacts between the particles it is possible for a cation to enter a cation exchange path and simultaneously for its "companion" anion to enter an anion exchange path. One can postulate that when the electric current passing through the electrolyte solution in the interstices between the particulates and through the particulates is such that the voltage drop across the interfaces between particulates AX and membrane C and between particulates CX and membrane A approaches a certain threshold voltage value (probably about 0.3 volts in the case of most commercially available anion exchange particulates and anion selective membranes) dissociation of water into hydrogen ions and hydroxide ions will occur at such interfaces, possibly catalyzed by weakly dissociated moieties. In this case, at membrane C, hydrogen ions will pass into the membrane and hydroxide ions will tend to ward anode $E^+$ through anion exchange particulate paths. At membrane A hydroxide ions will pass through the membrane and hydrogen ions will pass into cation exchange particle paths and tend toward cathode $E^-$. Similarly hydrogen and hydroxide ions can be formed at the junction between the CX and AX particles in the fifth column in the figure as well as between the CX particle in the second column and the AX particle immediately below such CX particle.

Such packed electrodialysis apparatus, operating at current densities which result in generation of hydroxide and hydrogen ions, may be regarded as continuously, electrically regenerated mixed bed ion-exchange deionizers. Cost effective apparatus and processes may be achieved by a judicious choice of ion exchange particles with regard to resin type, particle size and shape, and anion-to-cation ratio and relative positioning in addition to selection of the optimal combination of equipment design and operating process parameters.

Although FIG. 1(a) suggests that particulates AX and CX are beads or spheres they can in fact be any structures which provide fluid interstices and permit flow of such fluid in the interstices, for example irregular granules, thin rods preferably parallel with the surfaces of the membranes, fibers including woven or knitted fibers, saddles, rings, tellerettes, etc. For purposes of this invention beads, spheres, or other granules are highly preferred.

Other possible arrangements of ion exchange particulates in the deionization cells are possible. For instance, FIG. 1(b) illustrates schematically and in a simplified way another possible arrangement of such packing. In this case the low resistance path for anions will be through the anion exchange particulates AX. Cations will be constrained to migrate through the fluid in the interstices between the particulates. The interface between the particulates AX and membrane C will have the possibility of formation of hydrogen and hydroxide ions at that interface, when the applied current is such that the voltage drop between the particulates AX and the membrane C approaches a certain threshold value, as already discussed in connection with FIG. 1(a). Because of the superior conductivity of hydrogen ions relative to other ions, this type of configuration is more suited to acidic fluids, including weakly dissociated acids. The faster hydrogen ions will move through the fluid, and the anions will move through the particulates AX.

FIG. 1(c) represents another possible arrangement of the particulate packing. "S" represents a thin, highly foraminous sheet such as a plastic screen or expanded plastic sheet having openings sufficiently small to prevent contact between the CX and AX particles, but permitting the flow of fluid within and parallel to the plane of the sheet in at least one direction, e.g. from right to left in FIG. 1(c); E$^-$ represents a negatively charged electrode, i.e. a cathode in electrolytic communication with membrane C through electrolytic solution(s) and/or other membranes and/or ion exchange particulates; E$^+$ represents a positively charged electrode, i.e. an anode similarly in electrolytic communication with membrane A through electrolyte solution(s), other membranes and/or ion exchange particulates. The compartment represented by the region between membrane C and membrane A is a demineralizing, depleting, or diluting compartment.

The system of juxtaposed particulates AX and membrane A on the one hand and particulates CX and membrane C on the other hand will each behave essentially as equipotential extended surfaces, i.e. as membranes having extended surfaces, when the solution in the interstices and in the screen openings contains much less than about 0.1 gram- equivalent per liter of electrolyte, because the electrical resistance of the ion-exchange particulates will be much less than that of the solution.

The compartments adjacent to the deionization chambers in the illustrations of FIG. 1 need not be packed with ion-exchange particulates in non-reversal EDI, because the electrical conductivity of the more concentrated solution in those compartments will be much higher than in the deionization compartments. For EDI a screen support in the concentrating compartments is usually satisfactory. When using symmetrical polarity reversal, in which the compartment functions alternate between deionization and concentration, the compartments should all be packed.

The concept of electrodialysis apparatus containing mixed bed ion exchange particulates in deionization compartment was apparently first disclosed by Kunin, et.al. ("Ion Exchange Resins", Wiley, New York, 1950, p 109) but no data were given. Walters, et.al. (*Ind. Eng. Chem.*, 47, 61–67 (1955) and "Ion Exchange Technology", eds. Nachod and Schubert, Academic Press, New York, 1956) were apparently the first to disclose operating data. Other early disclosures were made by Glueckauf, et.al. (e.g., Second United Nations Conference on Peaceful Uses of Atomic Energy, Paper 308 (1958) and *Brit. Chem. Eng.*, 4, 646–651(1959)). Kedem, et.al., disclosed filled cell electrodialysis in which the dilute compartments were filled with various knit ion exchange fibers (*Desalination*, 16, 105-118 (1975)); such cells in the form of a tank having sealed concentrate compartments, the open dilute compartments being filled with granular anion exchange resin "which can be poured in and pumped out" (*Desalination* 24, 313–319 (1978)). In the latter publication the open dilute compartments may also contain knit cation exchange fibers against the cation selective membranes. The flow of fluid through the dilute compartments was by gravity which limited the flow rate and compartment size to uneconomic values. The apparatus had the advantage that it could be easily filled with particulate anion exchanger and such exchanger could be easily removed for cleaning or replacement. The concentrate compartments depended solely on electrical transfer of water through the surrounding membranes. As a result the concentrate was in fact very concentrated and subject to scaling and precipitation of poorly soluble electrolytes. The same author(s) reported on similar electrodialysis stacks in which the dilute chambers were filled solely with a net of multifilament anion exchange material (*Desalination* 46, 291-299 (1983)).

There have been many patent publications concerning packed cell electrodialysis including the following U.S. patents: U.S. Pat. Nos. 2,689,826; 2,815,320; 3,149,061; 3,291,713; 3,330,750; 3,515,664; 2,689,826; 2,815,320; 3,149,061; 3,291,713; 3,330,750; 3,515,664; 3,562,139; 3,686,089; 3,705,846; 3,993,517; 4,284,492; 4,632,745; 4,747,929; and 4,804,451. Nevertheless, although electrodialysis with packed cells (i.e. electrodeionization) has been known and studied for almost 40 years it has not yet received widespread commercial use. The reasons for this appear to be one or more of the following:

a) the need to fill individual compartments with ion exchange resin particulates, and the need to keep the resin in place while assembling the EDI stack, and the practical difficulties of doing this, especially for relatively large EDI stacks. Until now practical external filling and removal of the resin particulates has not been done because of lack of:
1) an EDI stack designed to be filled with resin after the stack has been assembled; and
2) a process to fill and empty such an assembled stack, by pumping a resin slurry into or out of the stack.

b) the particulate ion-exchange packing is a very good filter medium. The resistance to flow of fluid through the packing is increased by material filtered out during operation. In the case of conventional (chemically regenerated) ion exchange deionization, the ion exchangers are periodically backwashed at flow rates which expand the volume of the particulates, i.e. separating the particulars slightly from each other allowing filtered material to escape. Until now such bed expansion capability has not been a feature of electrodeionization apparatus. Instead electrodeionization has been preceded by fine filtration. The latter is nevertheless seldom completely effective.

c) anion exchange particulates tend to sorb negatively charged colloids and medium molecular weight anions which occur naturally in water. Such sorbed materials (generally termed foulants) interfere with the satisfactory operation of the apparatus, e.g. by increasing the electrical resistance and decreasing the rate of transport of ions to the particulates. In the EDI process the electric current tends to drive such foulants into the anion exchange particulates and thereby accelerate the fouling. Until now EDI stacks have in practice been preceded by scavenging type anion exchange resin and/or activated carbon columns to attempt to remove foulants before they can enter the stacks. Such pretreatment is costly and is seldom completely effective especially in view of often unpredictable breakthroughs of foulants on column exhaustion.

d) precipitates of sparingly soluble inorganic compounds (e.g., calcium carbonate, magnesium hydroxide, calcium sulfate) tend to form within the particulate packing, in the anion exchange membranes, or in the concentrate compartments of the electrodeionization apparatus if precursors of such compounds are present in the fluid processed. Such problem does not exist in conventional ion exchange deionization in which the anion- and cation-exchange particulates are separately regenerated with alkali and acid respectively. In conventional electrodialysis such precipitates are prevented by frequent, regular reversal of the direct electric current, e.g. a few times per hour.

e) at the water dissociating junctions between commercially available anion exchange bodies (i.e. membranes and particulates) and cation exchange bodies. quaternary ammonium moieties (the usual bound positively charged group in commercially available anion exchange bodies) are rapidly converted to tertiary amines and/or non-ionized groups resulting in increased electrical resistance at such junctions. Such conversion may be due to some combination of high alkalinity, high temperature, and high electric field in the junctions. There is not an equivalent phenomenon in conventional ion exchange deionization under normal process conditions. In the case of electrodeionization until now it has been necessary after some months to a year or so to disassemble the packed electrodialysis stack and replace at least the anion selective membranes and preferably also the anion exchange particulates. Some electrodeionization stacks are sealed (i.e. the membranes and filled inter-membrane spacers are glued together) in which case it is necessary to replace the entire stack except for the screen-filled concentrate spacers;

f) the electrical resistance of the packing depends also on the area of contact of the beads, hence on the deformability of the beads, the force causing such deformation, the distribution of bead sizes and any time dependent relaxation of the force, e.g. from cracking of the beads. The overall effect is usually a time dependent increase in electrical resistance requiring eventually repair or replacement of the electrodeionization stack. A similar problem does not exist in conventional ion exchange deionization as there is no electric field.

g) owing to the short distance between membranes in packed electrodialysis apparatus (e.g. about 0.3 centimeters) substantial channeling of processed fluids can occur resulting in less than expected performance.

SUMMARY OF THE INVENTION

It is therefore an objective of the invention to provide processes and apparatus which solve, ameliorate, or mitigate some or all of the above known deficiencies in electrodeionization apparatus, by:

a) providing processes and apparatus which permit filling an EDI membrane stack with ion exchange particulates after the stack has been assembled; and which permit removal of the ion exchange particulates without disassembly of the stack;

b) providing processes and apparatus which mitigate channeling in electrodeionization apparatus by providing one or more intermediate fluid remixing zones at least in those compartments which are packed with particulate ion exchangers;

c) providing processes and apparatus which permit at least part of the particulates in such packed compartments to be backwashed to remove unwanted non-ion-exchange particulates;

d) providing processes and apparatus which permit at least part of the particulate ion exchanger in such packed compartments to be removed cleaned, reactivated, and/or replaced; and then returned to such compartments.

DESCRIPTION OF THE DRAWINGS

FIG. 5 is a schematic diagram of a second preferred EDI intermembrane spacer to be packed with particulates;

FIG. 6 is a schematic diagram of a third preferred EDI intermembrane spacer to be packed with particulates;

A DETAILED DESCRIPTION OF PREFERRED EMBODIMENTS

The above and other objectives will become clear from the following description of preferred embodiments.

Figure 1A:
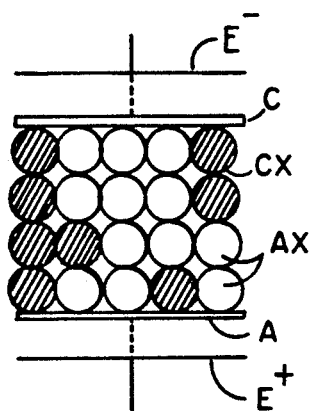
FIGS. 1a, b, c are schematic, simplified diagram of various EDI processes.
Figure 1B:
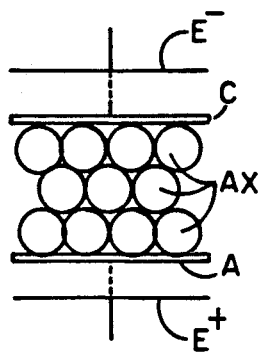
Figure 1C:
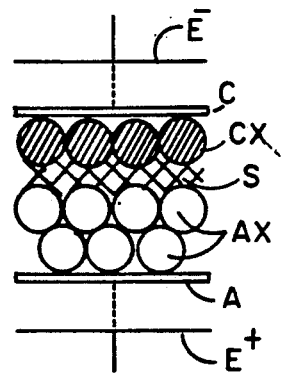
Figure 2:
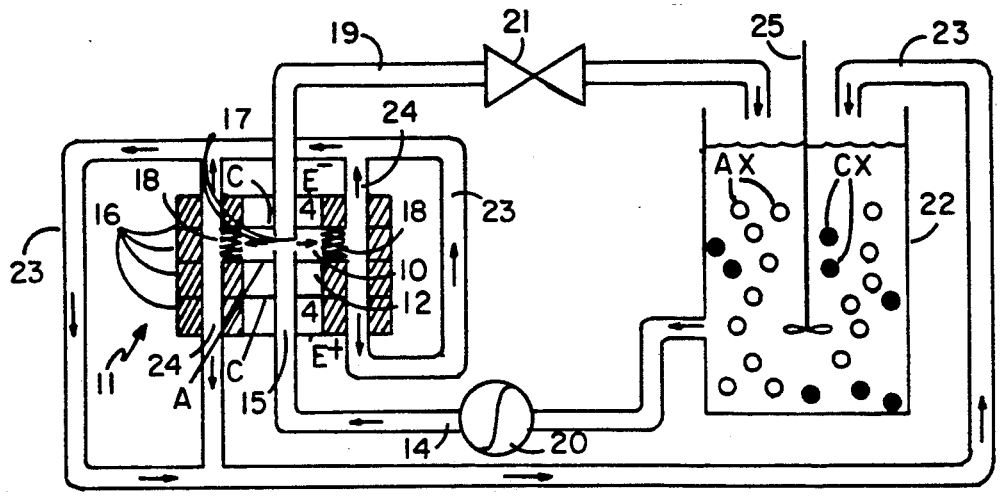
FIG. 2 is a schematic, simplified diagram of one preferred method and apparatus (according to a first aspect of this invention) for filling EDI compartments with ion exchange and other particulates.

Referring to FIG. 2 there is indicated schematically a packed cell electrodialysis (electrodeionization) stack 11 in a preferred embodiment having cation selective membranes C, and anion selective membrane A, an anode E+ and a cathode E−. Gaskets 16 separate the stack into electrode compartments 4, deionizing compartment(s) 10, and concentrating compartment(s) 12. Generally stack 11 will consist of many alternating membranes A and C and many alternating compartments 10 and 12, between one set of electrodes and electrode compartments. Influent fill conduit(s) 14 communicates with deionization compartment(s) 10 by means of deionization compartment internal fill manifold(s) 15 and deionization compartment inlet fill channels 17. Near the two ends of compartment(s) 10 are strainers 18 for retaining ion exchange particulates in compartment 10 against fluid passing through said compartment. Said strainers may for example take the form of screen, expanded plastic sheet, embossed plastic sheet, combs and the like. In the case of screen, comb, or expanded sheet the plane of the screen, comb, or sheet may be parallel, perpendicular, or at an angle to the direction of flow of fluid in compartment(s) 10. The apertures in said strainers must be smaller than at least some of the ion exchange particulates but not necessarily smaller than all such particulates since any particulates retained by strainers 18 will retain smaller particulates. For example if the particulates are in the range of 20 to 50 U.S. Standard Sieve Series then strainers 18 should be capable of retaining particulates of say, at least 30 mesh and larger (i.e. about 0.06 centimeters and larger). In one preferred embodiment, internal fill manifold(s) 15 also communicates with effluent fill conduit(s) 19 which can recirculate none, part, or all of the influent slurry through control valve 21 and back to tank 22. Fluid leaving compartment(s) 10 through strainers 18 leaves the stack through internal manifolds 24 which communicate with conduits 23. Vessel 22 contains a suspension of anion exchange particulates AX and cation exchange particulates CX in an appropriate fluid, for example water or aqueous solutions of sodium chloride or other solutes which prevent clumping of anion and cation resin particulates; or liquids which prevent said clumping as well as increase viscosity and/or density, such as glycerine, propylene glycol, or aqueous solutions thereof.

FIG. 2 schematically illustrates process and apparatus in a preferred embodiment for packing an EDI apparatus with particulate ion exchangers. During operation, particulates AX and CX are suspended in the fluid in vessel 22 by means of agitator 25. Conduits 14 and 19, internal fill manifold(s) 15, pumping means (preferably, for example, a recessed impeller pump) 20 are filled with appropriate fluid from vessel 22. When pumping means 20 is activated, the particulate suspension is drawn from vessel 22 and conveyed by influent fill conduit 14 to internal fill manifold 15. At least part of such suspension, as controlled by valve 21, passes through inlet channels 17 into compartment(s) 10. Fluid effluent from compartment(s) 10 passes through strainers 18, internal manifolds 24, and is preferably recirculated by conduits 23 to vessel 22.

During normal EDI operation (and preferably immediately after filling) fill conduits 14 and 19 are closed off to hold the packed particulates in place. Liquid to be processed then is pumped into internal manifold(s) 24 at one end of the stack only, passes through the first strainer(s) 18, compartment(s) 10, a second strainer(s) 18, a second internal manifold(s) 24 and out of the stack. (See FIG. 2 for key). This description of EDI operation is useful in describing the advantages of the present invention related to filling the EDI stack with particulates.

The process and apparatus of FIG. 2, related to filling the EDI stack with particulates, has many advantages for EDI operation. For example:
a) the size of the particulates AX and CX can be varied along the flow path in compartment(s) 10. For example the first increment of particulates can be of comparatively large size and easily retained by strainers 18, subsequent increments being smaller and the final increment again larger;
b) the relative blend of AX and CX particulates can be varied along the flow path. For example it is possible easily to make a multi-layered packing e.g. of alternating AX and CX particulates or the lower part of compartment 10 can contain such layered packing and the upper part randomly mixed particulates;
c) the portion of the packing in compartment 10 which is the first to contact fluid can have special properties, e.g. it can be non-ion exchange particulates or organic scavenging particulates even if such are poor electrolytic conductors or even electrical insulators.

In the interest of clarity, FIG. 2 shows only the circuits applying to the deionization compartments. Obviously conduits, manifolds, and inlets and outlets are required to bring fluids into and out of the concentrate chamber(s) 12. Such chambers can also be packed with ion exchange particulates which need not be the same in size or distribution of AX and CX particulates. If compartments(s) 12 are also packed and are identical with compartment(s) 10, then the choice of the polarities of electrodes E− and E+ is arbitrary, i.e. they can be interchanged as fully disclosed as one preferred embodiment in co-pending application Ser. No. 07/389,850 filed Aug. 3, 1989 and assigned to a common assignee. In the latter case compartment(s) 12 will become deionizing and compartment(s) 10 concentrating. The direction of passage of direct electric current can be changed for example once every 6 to 24 hours. Immediately following such reversal there will be a period of time which the apparatus requires to reach steady-state operation again. Such period can be compensated for by utilizing a somewhat larger apparatus and/or product storage tanks or by auxiliary conventional ion exchange deionizers or all of the above. Such reversing type electrodeionization apparatus is particularly advantageous since the reversal tends to remove fouling and scaling materials from the membranes and particulates. It is further advantageous in that the rate of increase in electrical resistance of the stack due to the conversion (in anion selective membranes and anion exchange particulates) of quaternary ammonium groups to non-quaternary moieties is reduced.

Many modifications of the process and apparatus in FIG. 2 can be made within the scope of the invention. For example, an alternate preferred embodiment would be to rotate the EDI stack 11 90 degrees so that stack components are vertical. This orientation will allow particulate containment in compartment 10(s) during downflow EDI operation. The upper strainers 18 and intermediate fill manifold 15 can then be removed allowing particulate fill via the upper internal manifold 24. This simpler construction compared to that shown in FIG. 2 can be traded off for various applications with the greater difficulties in filling a longer flow path and in structurally supporting the membrane areas adjacent to the internal manifold 24-compartment(s) 10 connection in the absence of a strainer support.

Figure 3:
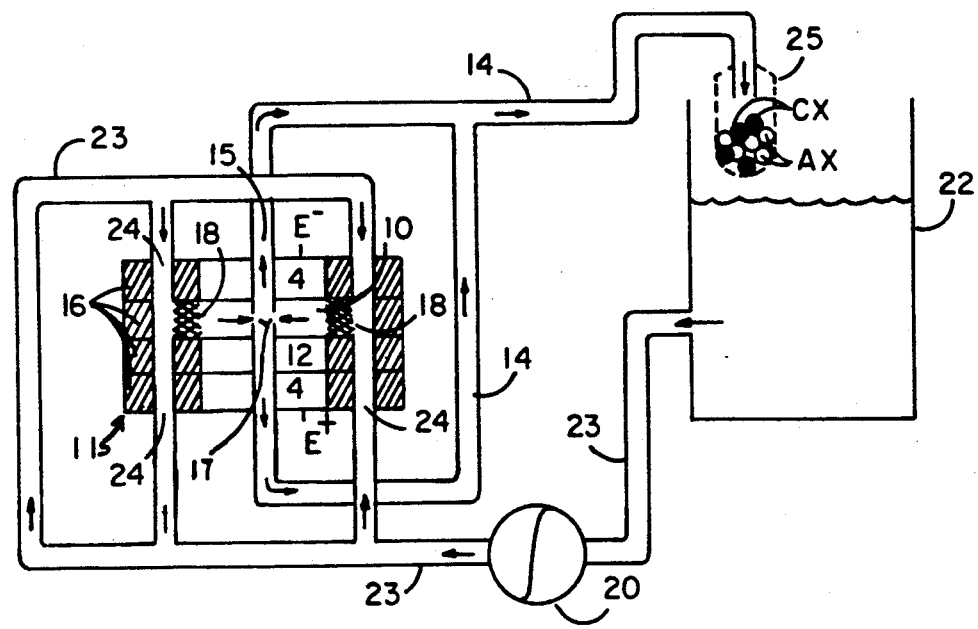
FIG. 3 is a simplified, schematic diagram of one preferred method and apparatus (according to a second aspect of this invention) for removing ion exchange and other particulates from EDI compartments.

FIG. 3 is a simplified, schematic diagram of process and apparatus for removing exchange particulates from the electrodeionization apparatus of FIG. 2 and for cleaning, reactivating, and/or replacing some or all of such particulates. Suitable fluid is taken from vessel 22 (which contains no particulates) by pumping means 20 (preferably the same as in FIG. 2) through conduits 23, entering stack 11 through internal manifolds 24 and strainers 18, suspending and eventually removing ion exchange particulates out of compartment(s) 10 through channels 17, internal manifolds 15, and conduits 14 to bag filter(s) 25. Particulates (and gas, if any) are separated from the fluid at this point prior to recycle into tank 22. Such fluid may be liquid ( e.g., water) or mixed liquid-gas (e.g., water-air). The particulates returned to bag filter 25 can then be cleaned of scale, for example with dilute acids or chelating agents, or of foulants, for example, with any de-fouling agent well known in conventional ion-exchange practice including enzymes. By means well known in the conventional ion-exchange art the particulates can be recovered in bulk form, classified into AX and CX fractions and/or into fractions according to particle size. Broken beads or spheres can be rejected. The cleaned particulates can be analyzed for degradation of properties by methods well known in the ion-exchange art and replaced if necessary.

Figure 4A:
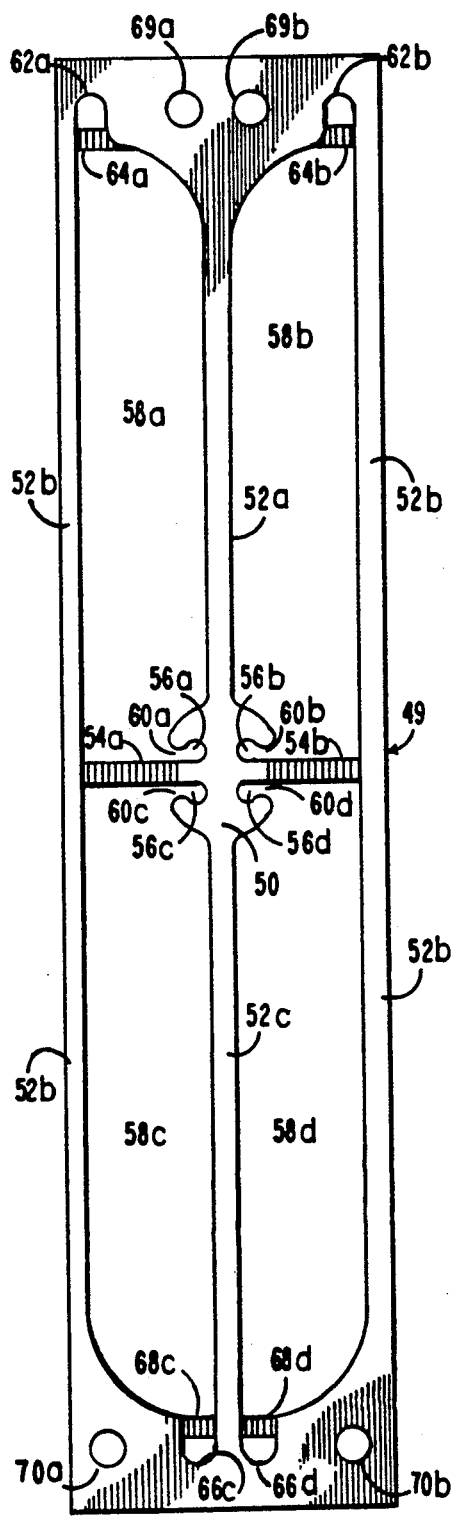
FIGS. 4a, b are schematic diagram of a first preferred EDI intermembrane spacer (according to a third aspect of this invention) to be packed with particulates.
Figure 4B:
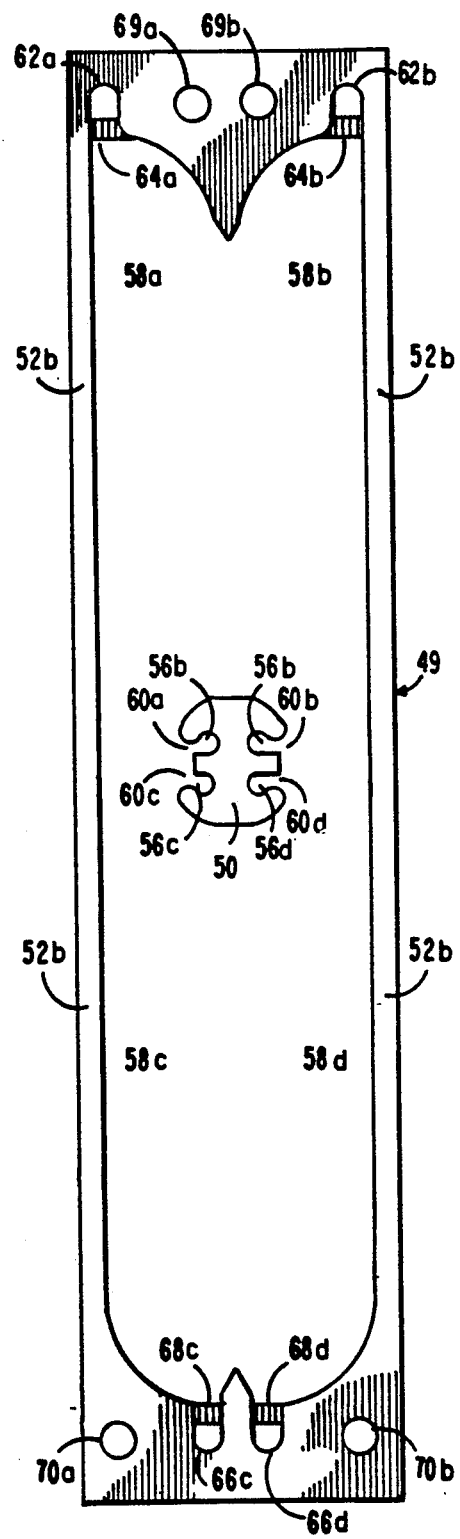
Figure 7A:
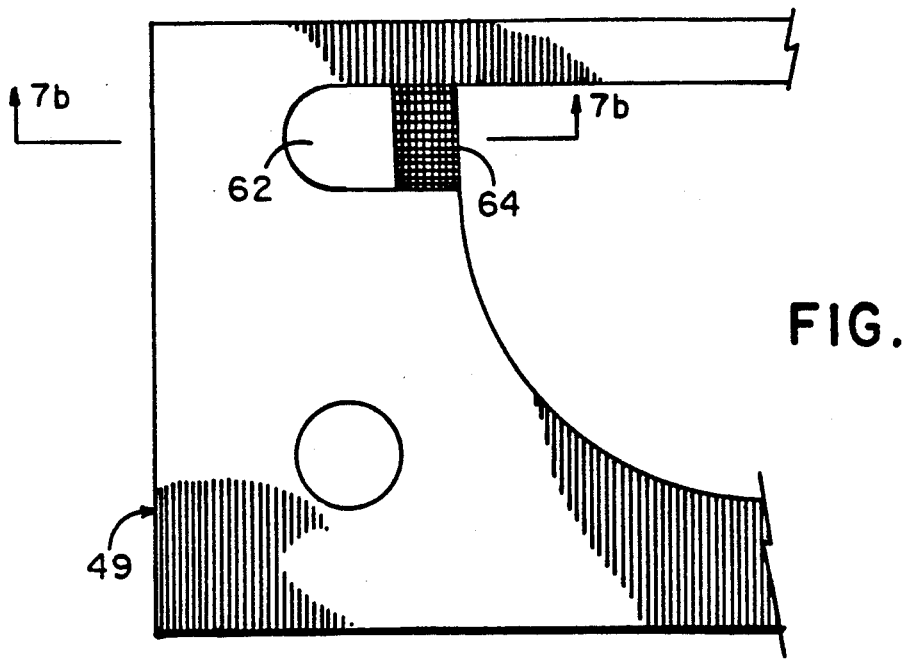
FIGS. 7a, b, c and d are simplified, schematic diagram of a preferred strainer (according to a fourth aspect of this invention) for retaining at least part of ion exchange particulates in packed compartments of EDI stacks.
Figure 7B:
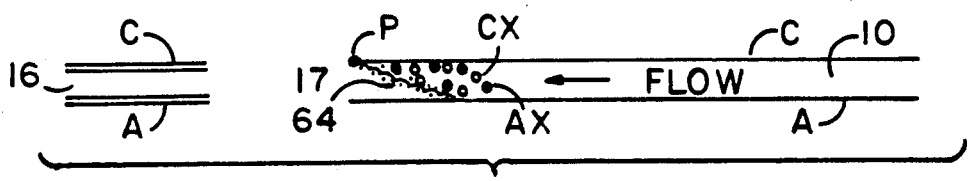
Figure 7C:
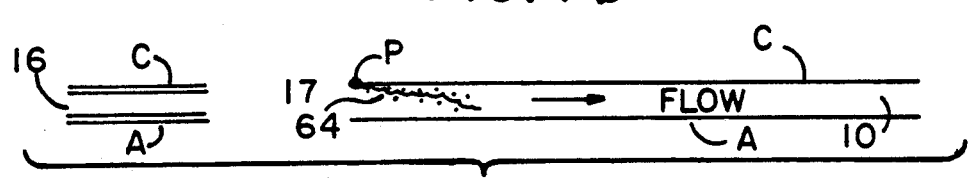
Figure 7D:

FIG. 4a shows schematically one preferred diluting chamber inter-membrane spacer 49 according to this invention. The spacer material may for example be any plastic or coated plastic which has suitable properties for the title apparatus and method. Examples of these properties are described below. The spacer may comprise for example any suitable plastic material. If the polymer or elastomer is hard then it is preferred that the surfaces (i.e. in the plane of FIG. 4) have a resilient layer or coating. 52b designates the peripheral structure of spacer 49. The peripheral structure provides mechanical support to parallel components above and below the plane of FIG. 4a, which are held in compression together; 52b also provides sufficient mechanical support so as to prevent its being blown outward by process pressure when held in such compression; 52b also provides sealing surfaces against adjacent membranes to prevent leakage to the outside or leakage into manifolds 69a,b, 70a,b. 52a and 52c are vertical ribs in spacer 49; these provide mechanical support to components above and below (similar to 52a and c) and support sealing surfaces between manifolds 56a–d and flow paths in concentrating spacers (not shown) on the other side of the adjacent membranes (also now shown). 62a and 62b indicate peripheral internal manifold holes communicating with cavities 58a and 58b resp. in said spacer while 66c and 66d indicate peripheral internal manifolds communicating with cavities 58c and 58d, resp. Cavities 58a and 58c on the one hand and 58b and 58d on the other are separated from each other by optional supports 54a,b; 54a,b provide additional mechanical support to prevent 52b from being blown outwards by process pressures. Such supports may be straps which are only part of the thickness of spacer 49; full thickness straps which are slotted externally and/or internally to permit fluid flow between the respective cavities; screens or expanded plastic; or the like. 50 designates a flow remixing width constrictor, in this case having intermediate internal manifolds 56a–d communicating with cavities 58a, 58b, 58c and 58d resp. by entrance channels 60a–d resp., thereby countering the effects of any fluid channeling in the latter cavities. Although strap supports 54a and 54b and constrictor 50 are shown more or less exactly in the middle of spacer 49 they can in fact be at any appropriate position between peripheral manifolds 62a and 62b on one hand and 66c and 66d on the other. For example constrictor 50 may be at the lower end of cavities 58c and d and rotated 90 degrees in which case the hydraulic flowpath may be from manifold 62a through cavities 58a and c (then e.g. constituting a single cavity), the cavities 58d and b (also then e.g. constituting a single cavity) exiting through manifold 62b with the elimination of manifolds 66c–d. It will be clear from the ensuing discussion that there may be more than one set of strap supports 54a and 54b and more than one width restrictor 50. Further FIG. 4a shows a spacer having two joined flow paths 62a, 64a, 58a, 54a, 58c, 68c, and 66c on the one hand and 62b, 64b, 58b, 54b, 58d, 68d, and 66d on the other. Rib 52a and 52c and strap supports 54a and 54b are optional. For example, as shown in FIG. 4b, width restrictor 50 may be totally detached from spacer 49 and fastened (e.g. by adhesive, stapling, sewing and the like) directly to at least one of the membranes facing spacer 49. It will be clear that a single flowpath spacer may be made consisting say, of 62a, 64a, 58a, 54a, 58c 68c and 66c of FIG. 4a in which case rib 52a and 52c becomes an external gasket and only the left half of restrictor 50 is included. On the other hand the spacer 49 may be multiplied for example by a factor of two in width (in which case there would be eight cavities instead of 4, four strap supports 54 instead of two, two width restrictors 50 instead of one etc.) or by a factor of three or more.

If strap supports 54a and 54b are absent or permit passage of all the particulate ion exchanger used, the spacer 49 in connection with an alternate preferred embodiment referred to FIG. 2. In this case supports 64a and 64b, if present, must also permit passage of all the particulate ion exchanger but inserts 68c and 68d must capture at least some of the larger particulates as discussed above. The particulates can be recovered from the compartment defined by spacer 49 by reversing the direction of flow as discussed in connection with FIG. 3. In such case manifold holes 56a through d and entrance channels 60a through d can be omitted. However such intermediate internal fill manifolds and channels (presented in the preferred embodiment described in FIGS. 2 and 3) offer several advantages:

1) they permit a dedicated particulate ion exchanger transfer system independent of the process fluid transfer (the latter system consisting of manifolds 62a and b and manifolds 66c and d), thereby much simplifying the management of such transfer, e.g. particulate exchanger can less easily by accident enter the process fluid transfer system and process fluid can less easily by accident enter the particulate exchanger transfer system. In this case particulate exchanger enters and leaves the various cavities through intermediate manifolds 56a through d. Strainer-supports 64a, b and 68c, d should then strain out at least the larger ion exchange particulates.

2) they permit removing and cleaning (or replacing or reactivating) the particulate exchanger in only one cavity at a time (and of course in the same cavities in parallel spacers in the apparatus which spacers have the same function). Thus for example it may be only the top few centimeters in cavities 58a and b which become fouled with particulates and/or colloids. Such cavities can be emptied through manifolds 62a and b (if supports 64a and b permit flow of all the particulate exchanger) by means of fluid flow through channels 60a and b while fluid flow through manifolds 66c and d is restricted or stopped by flow control means (e.g. one or more shut-off valves) in the external conduits communicating with manifolds 66c and d. Alternatively a reverse direction of flow in cavities 58a and b can instead flush the particulate exchangers out of channels 60a and b.

In the above mentioned case it is convenient if at least the upper half of constrictor 50 (or additional constrictor or half constrictor) and manifold holes 56a and b and channels 60a and b are located near manifold holes 62a and b so that only the contaminated particulate exchanger is removed. This will be particularly the case when the upper portions of cavities 58a and b contain for example an organic scavenging anion exchanger, activated carbon, silvered activated carbon, activated carbon containing other oligodynamic substances.

3) they permit backwashing of the packing in the cavities to remove contaminants which have been filtered out by the packing. For example, if cavities 58a and b are only about half filled with particulate exchanger then back flow from channels 60a and b, preferably from channels 60c and d can expand the packing sufficiently to permit the filtered material to be flushed out through manifolds 62a and b without removing the exchange particulates. In this case also it is convenient if the relevant intermediate channels 60 are located near manifolds 62a and b so that only the fouled particulate exchanger packing is expanded. Such arrangement also minimizes the required amount of unfilled space in cavities 58a and b. Particulates may be classified or kept unclassified, as necessary for backwashing by using suspending fluids of appropriate densities (e.g. brines or aqueous solutions of glycerine and/or propylene glycol) or by wet screening.

4) they permit the use of smaller particulate exchange packing than would otherwise be practical through use of a shorter flow path length and pressure drop during filling. Referring to FIG. 4a as an example, process fluid can enter at 60a through d leaving at 62a, 62b, 66c and 66d respectively.

For the sake of clarity, spacer 49 of FIGS. 4a or b refers only to a diluting compartment. It can be easily modified within the spirit of the invention to provide the necessary flows into and/or out of parallel concentrating compartments. For example two of the channels in restrictor 50 (say 60a and 60b) can be omitted in the spacer shown in the figure. It will be noted that when the spacer of FIG. 4a is turned end for end then inserts 64a and b will communicate with manifolds 70a and b and inserts 68c and d will communicate with intermediate manifolds 69a and b. Further channel 60c and d will communicate with intermediate manifolds 56a and b. Hence such inverted spacer (absent channels 60a and b) becomes a spacer for concentrating compartments. Such concentrating chamber can also be packed with particulate ion exchanger (particularly when reversal of the flow of electric current will be practiced) by the means previously discussed but at least should contain fluid permeable structure (e.g. woven or non-woven screen, expanded plastic, non-ion exchange, to enhance mass transfer to and from the membranes. In the case in which particulates are not used in the concentrating compartments, channels 60a-d will be absent in the concentrating spacers.

FIG. 5 illustrates a preferred spacer according to this invention having 8 particulate cavities and suitable, by appropriate orientation for both deionizing and concentrating particulate-filled compartments in an electrode-ionization stack. As shown, the spacer is designed to transport ion exchange particles into and out of compartments 58a through d through intermediate channels 60c and d. Process fluids may enter the spacer through the latter channels and exit through peripheral manifolds 62a and b and 66c and d. Alternatively such fluids may enter at manifolds 62a and b resp. If flow permeable straps 54a and b are not permeable to the ion exchange particulates then strainer supports 64a and b can be omitted, exchange particles from cavities 58a and b then being transferred through manifolds 62a and b. In such case it will be preferred if process fluids enter through manifolds 62a and b at least. Alternatively, if straps 54a, b are required for mechanical reasons but are not particulate permeable, and removal of strainers 64a,b is not desired, then additional similar intermediate manifold holes can be used (double the number in FIG. 5) to facilitate external filling and unfilling of 58a-d. Such a system is shown in FIG. 6. Of course, if the concentrating compartment does not contain particulates, then the additional intermediate manifolds shown in FIG. 6 are unnecessary.

While single stage EDI and EDI reversal have been discussed for the sake of simplicity, this invention is intended to cover multiple hydraulic and electrical stages by using various combinations of multiple manifold holes and intermediate manifold blocks within a given stack or by having separate stacks for separate stages or by using segmented electrodes.

FIG. 7 illustrates schematically and in simplified form a preferred particulate strainer useful in this invention. Such strainers are readily permeated by fluid but at least not by the largest ion exchange particulates used. In FIG. 7a such strainer 64 is shown in the form of woven or non-woven screen or expanded plastic crimped toward the left-hand edge, the material left of such crimp integral with or bonded to the spacer 49. The portion of such strainer to the right of such crimp hangs free. FIGS. 7b and 7c are cross-sections through section 7b of such strainer which may be defined as a water-permeable, particle-impermeable, for example foraminous flap valve. In FIG. 7b such flap valve is shown bonded at point p to the face of spacer 49 nearest cation selective membrane C. Where flow of fluid and/or particulate exchanger is toward the left as shown in FIG. 7b (i.e. into manifold 17), hydraulic resistance will force such strainer valve down against anion selective membrane A, trapping said particulates in chamber 10. When flow of fluid and/or particulate exchanger is toward the right as shown in FIG. 7c (i.e. from manifold 17), hydraulic resistance will force such strainer flap valve upward toward cation selective membrane C, permitting fluid and/or particulate exchanger to enter chamber 10. FIG. 7d is a schematic diagram of such a strainer flap valve in the form of a comb. Although the teeth of said comb are shown occupying substantially all the area of the comb, such teeth could in fact extend only a short distance from the right hand edge of the comb. The comb may consist of one or more layers of plastic monofilaments, ribbons, or strips bonded together at the left hand edge in the drawing.

EXAMPLES

Having described apparatus and processes particularly appropriate for the practice of the invention, the following are examples of the methods and apparatus of the invention carried out in an electrodeionization stack employing the above described spacers having intermediate width restrictors containing intermediate internal manifolds.

EXAMPLE 1

Approximately 1800 ml of equinormal cation and anion exchange resin beads are added to an approximately 680 liter fill tank to form a 0.33% by weight slurry in ultra-filtered water. Rohm & Haas Amerlite IR120 plus and IRA 458 resin beads are used.

Approximately 2.7 g/l of NaCl are dissolved in the tank to declump the anion and cation resin beads.

The electrodeionization stack to be filled is comprised of a single electrical stage with two major hydraulic stages, each with a flow path length of about 33", each hydraulic stage containing five cell pairs. The overall stack component dimensions (membranes, spacers, etc.) are 18" wide×40" long. The deionization compartment spacers are about 0.12 inches thick and in accordance with FIG. 5. The intermediate manifold holes are about ⅜ inch in diameter. The concentrating compartments are filled with plastic screen. In the concentrating spacer there are no channels between manifolds 56a–d and the flow path, and there are no strap supports 54a,b. The cation and anion flat sheet membranes which separate the diluting and concentrating spacers contain manifold holes congruent with the manifold holes in spacer 49 (62a,b; 69a,b; 66c,d; 70a,b; 56a–d) except the cation membrane separating the two hydraulic stages has only manifolds congruent with 66c,d and 70a,b.

A "resin fill" centrifugal pump with recessed impeller is then activated to establish a positive pressure in the ion depleting or diluting compartments of the stack. A backpressure of about 3.6 psig is imposed on the effluent from the diluting compartments to make certain that positive pressure compared to the concentrating compartments extends throughout the flow path (internal space) in the diluting compartment.

The supply tank mixer is then activated at such a rate that the resin beads quickly rise into suspension at least above the "resin fill" pump suction connection located part way up the wall of the supply tank.

The resin slurry is flowed by way of the eight intermediate manifolds (four from the bottom for the first major hydraulic stage and four from the bottom for the second) into the diluting compartments of the stack simultaneously. Referring to FIG. 4a, manifolds 56a and b service cavities 58a and 58b (comprising the first minor hydraulic stage) by means of channels 60a and b as illustrated in FIG. 4a and manifolds 56c and d service cavities 58c and d (comprising the second minor hydraulic state). Water in the slurry passes through the strainer-supports (screens) of the operating inlets and outlets of the diluting compartments (62a,b and 66c, d) and returns to the supply tank through appropriate valves and conduits.

Five additional 1800 ml increments of mixed ion exchange resin are added to the supply tank at 12-minute intervals. All but a small amount of the resin disappears into the stack at the end of the fill operation. The stack inlet pressure at this point is about 20 psig. Each of the intermediate manifolds are closed simultaneously by means of ball valves and the fill pump and stirrer are turned off.

The stack is then connected for normal water desalting operation. After the excess NaCl from the fill slurry is flushed from the system, the stack is operated to produce about 2 megohm-cm water at the expected flow rate using 1230 microSiemens/cm ($\mu$S/cm) feed water.

Following the operating period, the stack is disassembled and inspected. All diluting compartments are found to be substantially full of resin with negligible classification of the anion and cation resin beads.

The same stack is similarly filled with three increments of a 0.67% slurry, and in a separate test with one increment of 2% slurry. The 2% slurry fill is completed in about 32 minutes. In both cases, the diluting compartments on inspection are observed to be substantially full of resin with negligible resin classification. In another procedure the stack is similarly filled using a 0.33% resin slurry prepared with a solution made from 49% by vol. of propylene glycol and 56% ultra-filtered tap water. The fill operation is again completed with negligible classification of the resins.

EXAMPLE 2

The same EDI stack used to demonstrate resin filling is also used to demonstrate resin removal without stack disassembly.

The EDI stack is pressurized and then ball valves on the intermediate manifolds 56a–d are opened simultaneously. Resin bead slurry exits through the intermediate manifolds. Initially, the stack inlet pressure is 20 psig and this is maintained throughout the unfilling.

The resin is removed and recovered in a filter bag as the salt water carrier is recycled to the fill tank.

During removal of the particulate exchanger from the stack, resin removal is facilitated by starting and stopping the pump and by quickly opening and closing the ball valves on the intermediate manifold pipes.

Inspection of the stack after disassembly discloses that over 99% of the resin has been removed and recovered during the 15 minutes consumed in the above procedure. Similar results are obtained when a mixture of air and water is used to remove the particulates from the stack.

EXAMPLE 3

The electrodeionization stack of Examples 1 and 2 is reassembled with 150 more or less identical cell pairs using the same resin type, NaCl concentration, and fill procedure and apparatus except that several additional 1800 mL resin bead segments are added to the fill tank as the stack substantially fills. The stack is then operated to desalt 1000 $\mu$S/cm NaCl feed to 0.4 megohm-cm product at the expected rate. Inspection of the stack after disassembly discloses the average diluting compartment is more than 90% full of resin with negligible classification of the resin beads.

EXAMPLE 4

The electrodeionization stack of Example 3 is unfilled using the same apparatus and procedure as used in Example 2. Inspection of the stack during disassembly discloses that 90% of the resin which had flowed into the stack has now been flowed out into the filter bags.

These and all other equivalents are intended to be encompassed by the following claims.

I claim:

1. Apparatus comprising an electrodeionization stack, which stack comprises first and second sets of parallel chambers, the chambers of said first set alternating with chambers of said second set and separated therefrom by ion exchange membranes, the chambers of each said set comprising at least one flow path defined by an intermembrane spacer, each said at least one flow path in each set of chambers having at least one fluid channel communicating with a first fluid transfer manifold within said stack, each said at least one second channel spaced from said at least one first channel, said at least one second channel communicating with a second fluid transfer manifold within said stack, each of said at least one flow path in each set of chambers further having at least one-third channel communicating with a third fluid transfer manifold within said stack, said at least one-third channel positioned between said at least one first channel and said at least one second channel, said first, second and third manifolds adapted to transfer fluid solely into or out of said at least one flow path solely in one set of chambers, said at least one flow path in said one set of chambers adapted to be substantially filled with particulates comprising ion exchange particles if a suspension of particulates is flowed into said at least one flow path through at least one of said first and third manifolds, said at least one of first and second channels characterized by retaining at least some particulates if a suspension of particulates is flowed into said at least one flow path through at least one of said first and third manifolds.

2. Apparatus according to claim 1 in which said flow path in one set of chambers adapted to be filled with particulates contains in a first portion thereof ion exchange particles differing substantially in at least one characteristic from ion exchange particles in a second portion thereof.

3. Apparatus according to claim 1 in which said flow path in one set of chambers adapted to be filled with particulates contains at least in part organic scavenging type anion exchange particulates.

4. Apparatus according to claim 1 wherein said flow path in one set of chambers adapted to be filled with particulates contains at least in part a sorbent for at least some organic molecules or colloids.

5. Apparatus according to claim 1 in which at least some of said ion exchange membranes are bipolar membranes.

6. Apparatus according to claim 1 which also comprises means for changing the direction of direct current flow through said stack.

7. Apparatus according to claim 1 which also comprises means for changing the direction of hydraulic flow between at least two of said fluid transfer manifolds.

8. Apparatus according to claim 1 which also comprises mixing means for forming a suspension of particulates in a fluid and suspension forwarding means for transferring at least part of said suspension into said flow path in one set of chambers adapted to be filled with particulates.

9. Apparatus according to claim 1 which also comprises mixing means for forming a suspension of particulates in a fluid, suspension forwarding means for transferring at least part of said suspension into said stack and recycle means for transferring a portion of said part of said suspension out of said stack to said mixing means.

* * * * *